Patented June 16, 1936

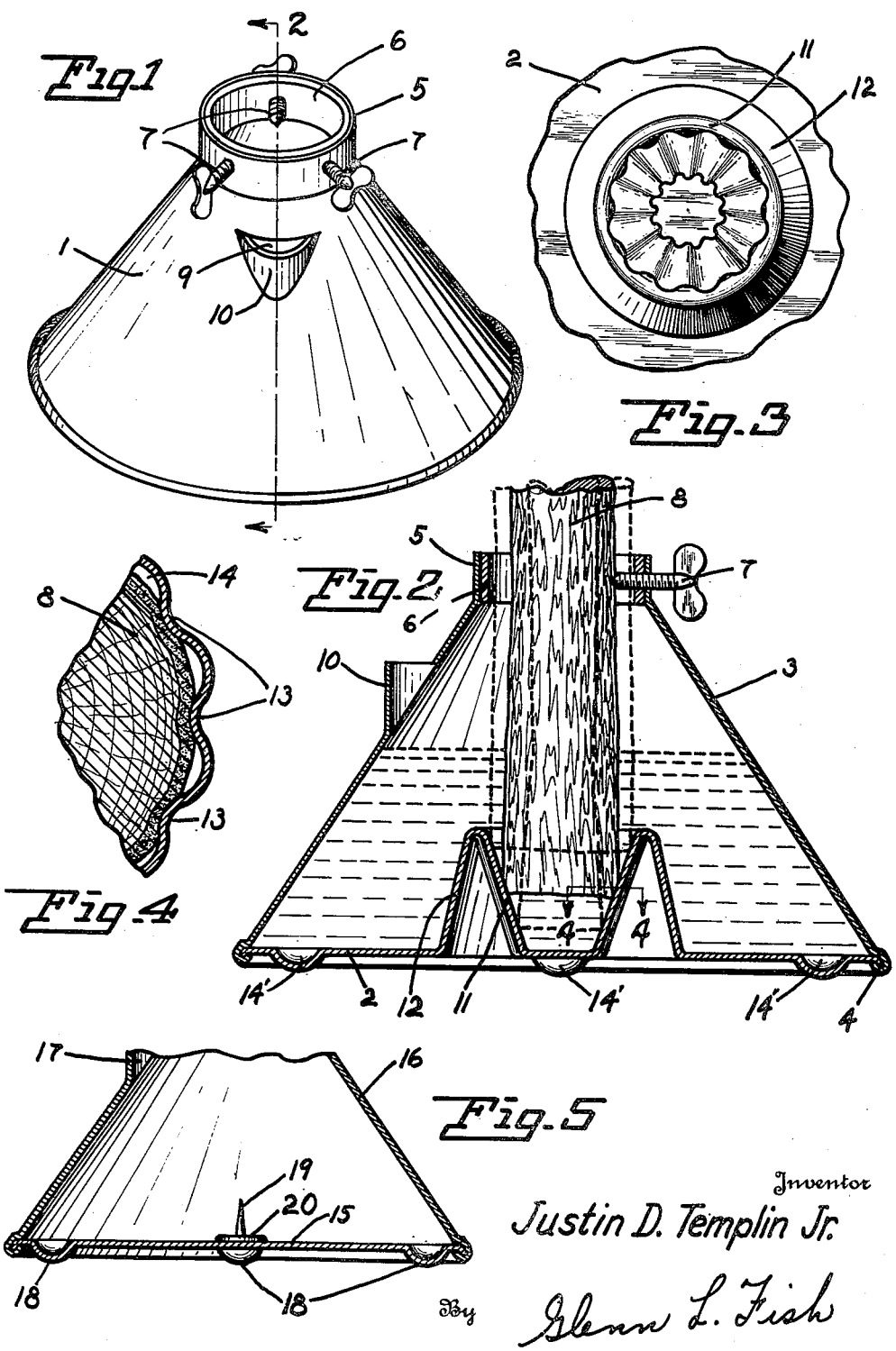

2,044,192

UNITED STATES PATENT OFFICE 2,044,192

TREE HOLDER

Justin D. Templin, Jr., Whitefish, Mont.

Application August 27, 1934, Serial No. 741,568

1 Claim. (Cl. 248—44)

This invention relates to an improved tree holder and while it is particularly intended as a holder for a Christmas tree it will be obvious that it may be used as a holder for other trees used for ornamental purposes.

One object of the invention is to provide a tree holder of such construction that a tree may be firmly supported in an upright position and water supplied to the lower end of the tree trunk thereby keeping the tree fresh for a long time and preventing the needles of a Christmas tree from falling after the tree has been in place a few days.

Another object of the invention is to so form the tree holder that the hollow water receiving body thereof will be of appreciably greater diameter at its bottom than at its upper end and thereby couse the greatest weight to be at the bottom of the holder and prevent the tree from easily tilting out of an upright position and falling over.

Another object of the invention is to provide the tree holder with an improved socket rising from its bottom for receiving the lower end of a tree trunk, the socket being so formed that trees having trunks of various diameters can be received in the socket, the socket being also so formed that passages will be provided between a tree trunk and walls of the socket through which water may flow into the lower portion of the socket where it will be taken up by the lower end of the tree trunk.

The invention is illustrated in the accompanying drawing, wherein:

Fig. 1 is a perspective view of the improved tree holder.

Fig. 2 is a section taken vertically through the tree holder along the line 2—2 of Fig. 1.

Fig. 3 is a fragmentary view looking down upon the socket carried by the bottom of the holder.

Fig. 4 is a fragmentary sectional view taken horizontally through a portion of the socket along the line 4—4 of Fig. 2.

Fig. 5 is a sectional view of a modified form of tree holder.

This improved tree holder is intended for use as a support for retaining a tree in an upright position and consists of a hollow body 1 having a bottom 2 and marginal walls 3 rising from the bottom and having their lower edges united to margins of the bottom by a joint 4 of a conventional construction used for sheet metal. The walls converge upwardly to form a conical body and at their upper ends terminate in a cylindrical neck 5 having tightly fitted therein a reinforcing ring 6 formed of strong metal and provided with threaded openings to receive set screws 7 which extend radially of the ring and collar and are spaced from each other circumferentially thereof. Three set screws are preferably used and are so spaced from each other that when they are screwed inwardly they will engage the trunk 8 of a tree passed inwardly through the collar into the body and firmly hold the tree in place. By loosening the screws the tree can be withdrawn from the holder. A portion of the walls adjacent the neck is slit transversely and the metal below the slit bent outwardly, thereby forming a filling opening 9 and a spout or lip 10 for directing water through the opening into the body. Therefore, the interior of the body can be easily filled with water and the water replenished as it evaporates.

In order to support the lower end of the tree trunk there has been provided a socket 11 which is of an inverted frustro-conical construction and is disposed directly below the neck concentric thereto. This socket is formed integral with the bottom by pressing a portion of the bottom upwardly and about the socket is formed a downwardly flaring skirt 12 which not only serves to connect the socket with the surrounding portions of the bottom but also braces the socket against tilting transversely out of an upright position. By having the socket tapered towards its lower end, tree trunks of various diameters may be received in the socket and have their lower ends bear against walls of the socket in wedging contact therewith, as shown in full lines in Fig. 2 and indicated by dotted lines in this figure. It will also be noted from an inspection of Figs. 2, 3 and 4 that walls of the socket are longitudinally corrugated, thereby forming vertically extending ribs 13 which project inwardly of the socket to engage the lower end of the tree trunk, as clearly shown in Fig. 4 and are spaced from each other circumferentially thereof to define passages 14 or channels through which water may flow into the lower portion of the socket when the lower end of a tree trunk is seated in the socket. By this arrangement, water in the hollow body may flow into the socket to completely fill the same about and below the lower end of a tree trunk and the water in the lower portion of the socket will be absorbed by the tree through the lower end of its trunk. This water in the lower portion of the socket will be constantly replenished as long as there is sufficient water in the body to flow into the upper end of the socket and, therefore, the tree will remain fresh for a long period of time and, in fact, it has been found that due to absorption of water through the lower end of the tree trunk new growth will appear upon the ends of the limbs of a tree and greatly add to the appearance of the tree. The fact that the body is cone-shaped and, therefore, a great deal smaller at its upper end than at its bottom, causes the major portion of the weight to be at the bottom of the holder when it is filled with water and it will firmly remain in an upright position and prevent a tree from easily tilting and falling over when set up and supported in the holder. Portions of the bottom between the socket and its margins are stamped to form depending feet 14' which rest upon a floor and allow air to circulate under the holder so that a floor will not be stained by water which might otherwise gather under the holder if spilled when filling the body through the inlet opening. When use of the tree is no longer desired, it is merely necessary to unscrew the set screws and the trunk of the tree can be drawn upwardly out of the holder. Water in the body can then be poured out and the holder put away until again needed.

The tree holder illustrated in Fig. 5 is in most respects similar in construction to that previously described and has a bottom 15, marginal walls 16, a filling spout 17 and depending feet 18. Instead of providing the bottom with a socket under the neck of the body, the bottom carries at its center a spur or prong 19 having a base 20 which is soldered, brazed, or otherwise firmly secured to the bottom. This spur projects upwardly from the bottom and is of sufficient length and thickness to penetrate the lower end of a tree trunk and hold the trunk against transverse movement when the set screws are tightened. The enlarged base not only serves to firmly connect the spur with the bottom of the holder, but also prevents the lower end of the tree trunk from resting directly upon the bottom and water in the holder can be absorbed through the lower end of the trunk.

Having thus described the invention, what is claimed as new is:

A tree holder comprising a hollow body having a bottom and side walls, an opening being provided in the upper portion of the body for passage of a tree trunk vertically through the body, a portion of the bottom under the opening being projected upwardly to form an inverted cone-shaped socket concentric to the opening and a supporting skirt surrounding the socket and bracing the socket against transverse displacement, walls of the socket being longitudinally corrugated to provide transversely spaced vertically extending ribs adapted to embed themselves in the lower end of a tree trunk in spaced relation to each other circumferentially thereof and grip the tree with portions of the socket walls between the ribs defining water passages about a tree trunk resting in the socket whereby the socket may be filled with water.

JUSTIN D. TEMPLIN, Jr.